(12) United States Patent
Feng et al.

(10) Patent No.: US 10,783,437 B2
(45) Date of Patent: Sep. 22, 2020

(54) HYBRID AGGREGATION FOR DEEP LEARNING NEURAL NETWORKS

(71) Applicant: International Business Machines Corporation, Armonk, NY (US)

(72) Inventors: Minwei Feng, Yorktown Heights, NY (US); Yufei Ren, Somers, NY (US); Yandong Wang, Elmsford, NY (US); Li Zhang, Yorktown Heights, NY (US); Wei Zhang, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 836 days.

(21) Appl. No.: 15/450,010

(22) Filed: Mar. 5, 2017

(65) Prior Publication Data
US 2018/0253646 A1   Sep. 6, 2018

(51) Int. Cl.
| | |
|---|---|
| *G06E 1/00* | (2006.01) |
| *G06F 12/00* | (2006.01) |
| *A61K 35/74* | (2015.01) |
| *G06Q 30/06* | (2012.01) |
| *G06F 12/02* | (2006.01) |
| *G06N 99/00* | (2019.01) |
| *G06N 3/08* | (2006.01) |
| *G06N 3/04* | (2006.01) |

(52) U.S. Cl.
CPC ......... *G06N 3/084* (2013.01); *G06N 3/0454* (2013.01)

(58) Field of Classification Search
CPC .. G06N 3/08; G06N 3/02; G06N 3/04; G06N 3/084; G06N 3/0454

USPC ...................................................... 706/1–62
See application file for complete search history.

(56) References Cited

U.S. PATENT DOCUMENTS

| | | | |
|---|---|---|---|
| 9,336,483 B1* | 5/2016 | Abeysooriya | ............ G06N 3/08 |
| 2010/0281214 A1* | 11/2010 | Jernigan, IV | ......... G06F 3/0608 |
| | | | 711/114 |
| 2010/0332373 A1* | 12/2010 | Crabtree | ................ G06Q 40/04 |
| | | | 705/37 |

(Continued)

OTHER PUBLICATIONS

Rudolph, G. L. (1995). Location-Independent Neural Network Models (Doctoral dissertation, Brigham Young University. Department of Computer Science). (Year: 1995).*

(Continued)

*Primary Examiner* — Brandon S Cole
(74) *Attorney, Agent, or Firm* — Garg Law Firm, PLLC; Rakesh Garg; Joseph Petrokaitis

(57) ABSTRACT

A processing unit topology of a neural network including a plurality of processing units is determined. The neural network includes at least one machine in which each machine includes a plurality of nodes, and wherein each node includes at least one of the plurality of processing units. One or more of the processing units are grouped into a first group according to a first affinity. The first group is configured, using a processor and a memory, to use a first aggregation procedure for exchanging model parameters of a model of the neural network between the processing units of the first group. One or more of the processing units are grouped into a second group according to a second affinity. The second group is configured to use a second aggregation procedure for exchanging the model parameters between the processing units of the second group.

16 Claims, 6 Drawing Sheets

(56) References Cited

U.S. PATENT DOCUMENTS

| | | | | |
|---|---|---|---|---|
| 2013/0125097 A1* | 5/2013 | Ebcioglu | ............... | G06F 8/4452 717/136 |
| 2015/0324690 A1 | 11/2015 | Chilimbi et al. | | |
| 2016/0030494 A1* | 2/2016 | Henn | ................... | A61K 35/741 424/282.1 |
| 2016/0210550 A1* | 7/2016 | Merrill | ................ | G06N 3/0454 |
| 2016/0321776 A1 | 11/2016 | Zou et al. | | |
| 2020/0137094 A1* | 4/2020 | Janakiraman | ....... | H04L 63/1425 |

OTHER PUBLICATIONS

Dean et al. (2012). Large scale distributed deep networks. In Advances in neural information processing systems (pp. 1223-1231). (Year: 2012).*

López, G. O. (2015). High performance computing for solving large sparse systems. Optical diffraction tomography as a case of study (vol. 335). Universidad Almería. (Year: 2015).*

Iandola, F. (May 2016). Distributeddeep neural network training: A measurement study. (Year: 2016).*

Wang et al. (2016). Deep learning at scale and at ease. ACM Transactions on Multimedia Computing, Communications, and Applications (TOMM), 12(4s), 69. (Year: 2016).*

Su, H., & Chen, H. (2015). Experiments on parallel training of deep neural network using model averaging. arXiv preprint arXiv:1507.01239. (Year: 2015).*

Patterson, J. C. (2012). Managing a real-time massively-parallel neural architecture (Doctoral dissertation, the University of Manchester (United Kingdom)). (Year: 2012).*

Sant'Ana, L., Cordeiro, D., & Camargo, R. (Sep. 2015). Plb-hec: A profile-based load-balancing algorithm for heterogeneous cpu-gpu clusters. In 2015 IEEE International Conference on Cluster Computing (pp. 96-105). IEEE. (Year: 2015).*

Henggang Cui et al., GeePS: Scalable Deep Learning on Distributed GPUs with a GPU-Specialized Parameter Server, http://www.pdl.cmu.edu/; Apr. 21, 2016.

Wei Wang et al., Deep Learning at Scale and at Ease, https://arxiv.org/pdf; arxiv.org, Mar. 25, 2016.

* cited by examiner

HYBRID AGGREGATION FOR DEEP LEARNING NEURAL NETWORKS

TECHNICAL FIELD

The present invention relates generally to a method, system, and computer program product for aggregation of data in a deep learning neural network. More particularly, the present invention relates to a method, system, and computer program product for hybrid aggregation operations for deep learning neural networks.

BACKGROUND

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior. A feedforward neural network is an artificial neural network where connections between the units do not form a cycle.

In machine learning, a convolutional neural network (CNN) is a type of feed-forward artificial neural network in which the connectivity pattern between its nodes (neurons) is inspired by the organization of the animal visual cortex, whose individual neurons are arranged to respond to overlapping regions tiling a visual field. Convolutional networks mimic biological processes and are configured as variations of multilayer perceptrons designed to use minimal amounts of preprocessing while processing data, such as digital images.

Convolutional neural networks (CNN) are networks with overlapping "reception fields" performing convolution tasks. A CNN is particularly efficient in recognizing image features, such as by differentiating pixels or pixel regions in a digital image from other pixels or pixel regions in the digital image. Generally, a CNN is designed to recognize images or parts of an image, such as detecting the edges of an object recognized on the image. Computer vision is a field of endeavor where CNNs are commonly used.

A deep neural network (DNN) is an artificial neural network (ANN) with multiple hidden layers of units between the input and output layers. Similar to shallow ANNs, DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

Many large scale data-intensive applications rely on both input data and a large number of model parameters to conduct computation. Deep learning algorithms are typical examples of this category. Machine learning algorithms generate models to fit training data and then use the generated models to generate predictions for input data. Models are generally mathematical equations and/or logic having model parameters. Model training is used to find appropriate values of the model parameters so that the models can provide accurate predictions. In a typical example of training of a model, a batch of image data is input to a model and computations are performed on the image data using the model to provide an output used to train the model.

One procedure for training a deep learning neural network includes the use of a forward pass and backpropagation. The forward pass is used to assess the quality of the model as quantified by a loss value, and backpropagation is used to generate a gradient with respect to the current weights of the model. When input data is presented to the neural network, it is propagated forward through the network, layer by layer, until it reaches an output layer. The output of the output layer is compared to a desired output using a loss function, and an error value is calculated for each of the neurons in the output layer. The error values are then propagated backwards, starting from the output, until each neuron has an associated error value which roughly represents its contribution to the original output. Backpropagation uses these error values to calculate a gradient of the loss function with respect to the weights in the network. The gradient is used to update the weights in an attempt to minimize the loss function.

As the network is trained, the neurons in the intermediate layers organize themselves in such a way that the different neurons learn to recognize different characteristics of a total input space. After training, when an arbitrary input is input to the neural network, neurons in the hidden layer of the network respond with an active output if the new input contains a pattern that resembles a feature that the individual neurons have learned to recognize during their training.

Gradients generated for different items within the same batch are accumulated during batch processing, and normalized at the end of the batch resulting in an iteration for each batch processing. Current deep learning frameworks utilize multiple local graphics processing units (GPUs) to accelerate training. Current aggregation methods utilize homogeneous single-instance multi-GPU training in which a single aggregation approach is used.

A typical machine may include multiple GPUs located within a node of the machine such as a non-uniform memory access (NUMA) node. A NUMA node often includes a physical CPU, memory banks, a directed attached network device, and multiple GPU devices. The network devices and GPUs are typically attached to the CPU through a Peripheral Component Interconnect (PCI) root complex device. A root complex device connects the CPU and memory subsystem to one or more devices such as a GPU. In addition, each machine may include multiple nodes each having multiple GPUs. Typically, GPUs within a single node aggregate gradient information exchanged between the GPUs within the node using a particular aggregation method. A suitable aggregation method for multi-GPU communication within a node may include an AllReduce-based aggregation approach to aggregate gradients. In an AllReduce approach, each GPU computes gradients related to a portion of the data, reduces the gradients and broadcasts the reduced gradients to the other GPUs using multi-GPU communication within the node to aggregate the gradients. In general, exchanging GPU memory data within a node is faster than across nodes in the same machine, exchanging GPU memory data across nodes in the same machine is faster than exchanging GPU memory data across machines within a network.

In addition, in a typical machine GPUs located across nodes communicate gradient information with each other using inter-node communication. A suitable aggregation method for inter-node communication between GPUs is a tree-based aggregation approach in which a root GPUs of a tree-structure exchange gradient information with a next level GPU, and the next level GPUs exchange gradient information with each other to produce aggregated gradient information. Embodiments realized that a problem with homogeneous single-instance multi-GPU training is that it is not suitable for situations in which multiple machines, each having one or more nodes and each node having one or more GPUs, must aggregate gradient information among themselves. Embodiments realized that as the model size of the neural network becomes larger, current aggregation approaches suffer from scalability issues and throughput degradation becomes even more severe under small batch sizes. Various embodiments described herein provide for hybrid aggregation of model training parameters, such as gradient information, to improve the scalability of multi-GPU based deep learning networks.

SUMMARY

The illustrative embodiments provide a method, system, and computer program product. An embodiment of a method includes determining a processing unit topology of a neural network including a plurality of processing units, wherein the neural network includes at least one machine in which each machine includes a plurality of nodes, and wherein each node includes at least one of the plurality of processing units. The embodiment groups one or more of the processing units into a first group according to a first affinity. The embodiment configures, using a processor and a memory, the first group to use a first aggregation procedure for exchanging model parameters of a model of the neural network between the processing units of the first group. The embodiment groups one or more of the processing units into a second group according to a second affinity. The embodiment configures the second group to use a second aggregation procedure for exchanging the model parameters between the processing units of the second group. Thus, the embodiment provides for the exchange of model parameters of a neural network model using hybrid aggregation procedures to minimize bandwidth consumption.

In one embodiment, the first affinity includes processing units within a same node of a same machine.

In another embodiment, the second affinity includes processing units within the same machine but different nodes.

In an embodiment, the first aggregation procedure includes an AllReduce-based aggregation procedure.

In another embodiment, the second aggregation procedure includes a tree-based aggregation procedure.

Another embodiment further receives training data, computes an iteration of the model to generate the model parameters, and exchanges the model parameters between processing units of the first group using the first aggregation procedure.

Another embodiment further determines a leader processing unit for the first group, and exchanges the model parameters between the leader processing unit of the first group and a leader processing unit of another group using the second aggregation procedure.

Another embodiment further groups one or more of the processing units into a third group according to a third affinity, and configures the third group to use a third aggregation procedure for exchanging model parameters of a model of the neural network between the processing units of the first group.

In one embodiment, the third affinity includes processing units within different machines of the neural network.

In another embodiment, the third aggregation procedure includes a model averaging aggregation procedure.

Another embodiment further sends the model parameters to a server, wherein the server is configured to determine updated model parameters using the third aggregation procedure.

Another embodiment further receives the updated model parameters, broadcasts the updated model parameters to the plurality of processing units, and updates the model of the neural network based upon the updated model parameters.

In another embodiment, the model parameters include a gradient of a loss function of the neural network.

In another embodiment, the plurality of processing units includes a graphics processing unit.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
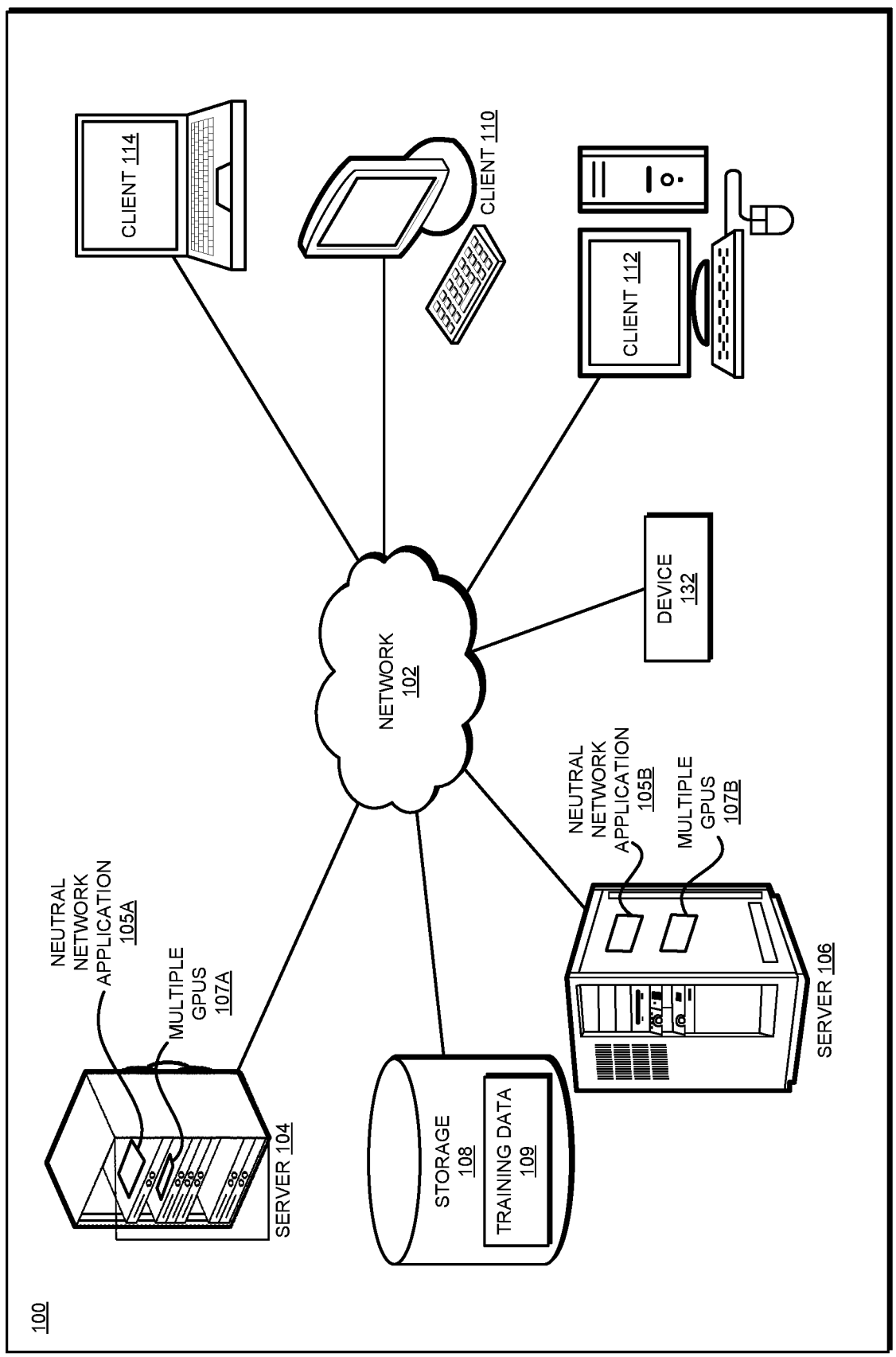
FIG. 1 depicts a block diagram of a network of data processing systems in which illustrative embodiments may be implemented.

The illustrative embodiments described herein generally relate to hybrid aggregation of model parameters operations in a neural network such as a deep learning neural network. In accordance with one or more embodiments, a machine, such as a server, includes multiple nodes and each node includes multiple graphics processing unit (GPUs). In particular embodiments, a GPU card includes multiple GPUs upon the same card, and the GPU card is configured to be inserted into a node of the machine. In one or more embodiments, multiple machines, each having multiple nodes and GPUs, are in communication with each other to implement a neural network.

In one or more embodiments, different aggregation methods are used to exchange model parameters trained by different graphics processing unit (GPU) learners in a multi-GPU based deep learning neural network. In particular embodiments, an application determines the particular aggregation method used by a particular GPU based upon the topology of the GPUs and the available bandwidth of different communication channels bridging the GPUs in different regions or on different machines. In a particular example, at a lowest layer an application configures individual GPUs within the same node to use an All-Reduce aggregation procedure to exchange model parameters during training of the neural network. In the particular example, at an intermediate layer the application configures nodes on the same machine to use an aggregation tree based per-batch aggregation procedure to exchange model parameters between the nodes on the same machine. In the particular example, at a highest layer the application configures the machine to use a model averaging aggregation procedure to facilitate model parameter, such as weights, exchanges between machines. In particular embodiments, machines exchange model parameters through a parameter server at the highest level.

In one or more embodiments, an application determines a physical graphics processing unit (GPU) topology to determine optimal aggregation methods for training a neural network such as a deep learning neural network. In various embodiments, the GPU topology describes a relationship between different GPUs including an identification of the GPUs that are located in the same node of a machine, an identification of the GPUs that are located within the same machine but different nodes, and an identification of the GPUs that are located in different machines. In one or more embodiments, the application groups GPUs according to the respective affinities between GPUs in which the respective affinities indicate the relationship between respective GPUs. In an embodiment, one or more GPUs are grouped into a first group according to a first affinity including GPUs within the same node of the same machine, one or more GPUs are grouped into a second group according to a second affinity including GPUs within the same machine but different nodes, and one or more GPUs are grouped into a third group according to a third affinity including GPUs within different machines.

In an embodiment, the application configures a first aggregation procedure for model parameter exchange between GPUs within the same node of the same machine (i.e., the first group). In one or more embodiments, the model parameters are an input of a cost function of the neural network. In particular embodiments, the first aggregation procedure is an AllReduce-based per-batch aggregation procedure. In an embodiment, the application configures a second aggregation procedure for model parameter exchange between GPUs across nodes in the same machine (i.e., the second group). In particular embodiments, the second aggregation procedure is an aggregation tree-based per-batch aggregation procedure. In an embodiment, the application configures a third aggregation procedure for model parameter exchange between GPUs across different machines in the neural network (i.e., the third group). In particular embodiments, the third aggregation procedure is a model averaging aggregation procedure. In one or more embodiments, the third aggregation procedure exchanges model parameters between GPUs of different machines via a parameter server. In particular embodiments, the third aggregation procedure exchanges model parameters in multiple batches instead of on a per-batch basis.

In an embodiment, the application receives training data for training the neural network. In a particular embodiment, the training data includes image data. In the embodiment, one or more of GPUs of the neural network compute a first iteration of training to generate model parameters. In an embodiment, the GPUs in the same node of the same machine exchange the model parameters using the first aggregation procedure.

In an embodiment, the application, or alternately the GPUs, determine a leader GPU for the GPUs within the same node. In a particular embodiment, the application determines the leader GPU based upon a GPU identifier associated with each GPU of the node. In another embodiment, the application determines the leader GPU based upon available bandwidth or processing power of a particular GPU. In a particular example, the application elects the GPU having the lowest value of a GPU identifier among the GPU identifiers of the GPUs of the node as the leader GPU for the node. In an embodiment, the leader GPUs for each node within the same machine exchange model parameters using the second aggregation procedure.

In an embodiment, the application determines whether a cross-machine exchange of model parameters between GPUs in different machines is necessary for training. If cross-exchange is necessary, the application determines a leader GPU of all GPUs within a machine. In an embodiment, the leader GPU for each machine sends the model parameters to a parameter server. In a particular embodiment, the parameter server is a server configured to receive model parameters from one or more machines, perform the third aggregation procedure on the model parameters to determine updated model parameters, and send the updated model parameters to the leader GPU for each machine. In an alternative embodiment, one or more of the leader GPUs for a machine, receives the model parameters from the leader GPU for each machine, performs the third aggregation procedure on the model parameters to determine the updated parameters, and sends the updated model parameters to the leader GPU for each machine without requiring use of the parameter server.

In an embodiment, the leader GPU for each machine receives the updated model parameters from the parameter server and broadcasts the updated model parameters to the leader of each group of GPUs within a node of a machine. In an embodiment, the leader of each group of GPUs within a node broadcasts the updated model parameters to each group member of the GPUs within the same node. In an embodiment, the application and/or GPUs update the model of the neural network based upon the updated model parameters. In one or more embodiments, one or more portions of the procedure are repeated using additional training data until the model is trained to a satisfactory level.

The illustrative embodiments are described with respect to certain types of GPUs, machines, neural networks, neural network models, neural network model parameters, aggregation procedures, transmissions, responses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
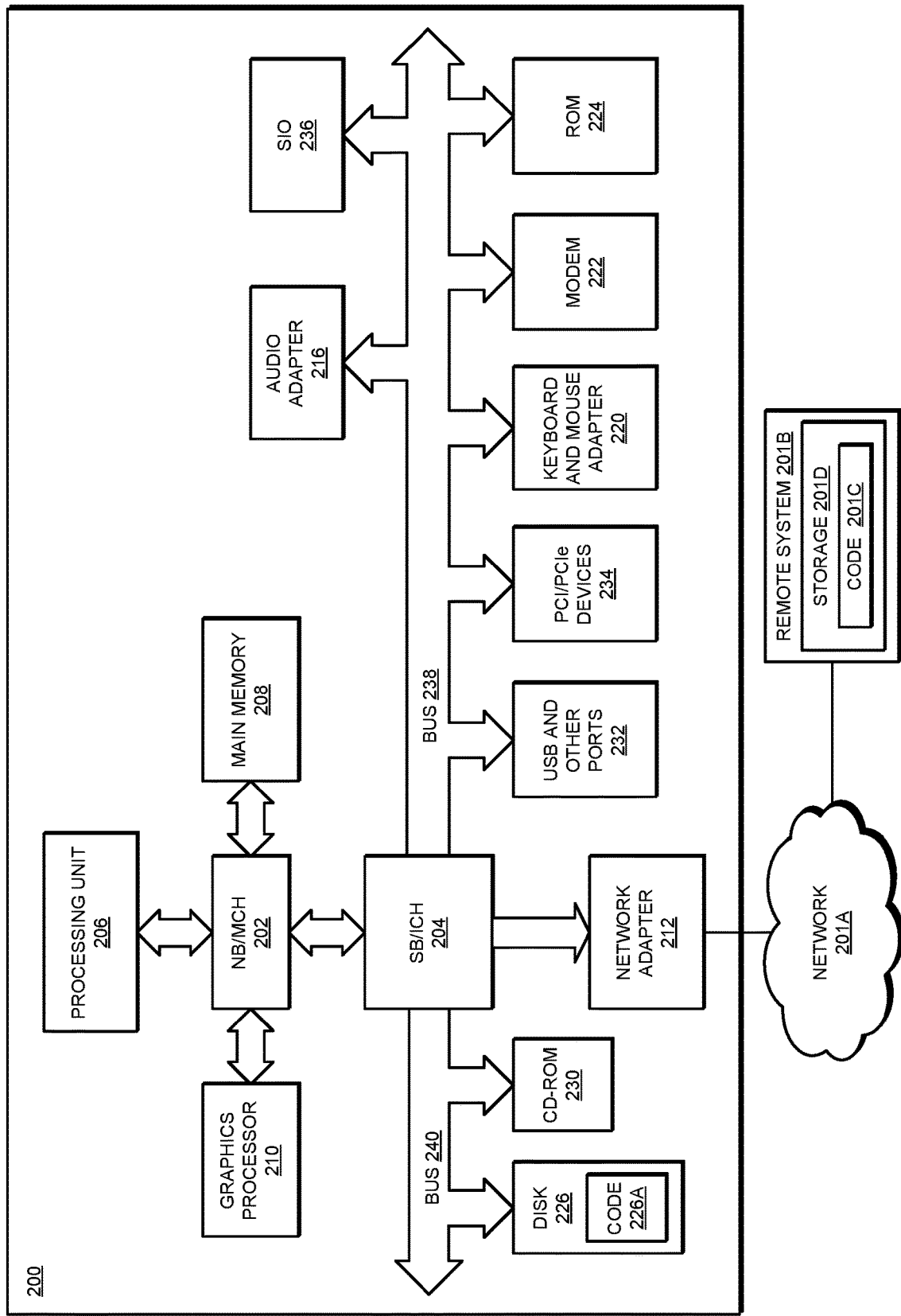
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage 108 may be configured to store training data 109, such as image data, for training a neural network. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

In an embodiment, one or more of neural network application 105A of server 104 and neural network application 105B of server 106 implements an embodiment of a neural network, such as a deep learning neural network, as described herein. In a particular embodiment, the neural network is implemented using one of network application 105A and network application 105B within a single server. In another particular embodiment, the neural network is implemented using both neural network application 105A and neural network application 105B within a single server. Server 104 includes multiple GPUs 107A including multiple nodes in which each node may include one or more GPUs as described herein. Similarly, server 106 includes multiple GPUs 107B including multiple nodes in which each node may include one or more GPUs as described herein.

Device 132 is an example of a device described herein. For example, device 132 may send a request to server 104 to perform one or more data processing tasks by neural network applications 105A, 105B such as initiating training of the neural network. Any software application described as executing in another data processing system in FIG. 1 can be configured to execute in device 132 in a similar manner. Any data or information stored or produced in another data processing system in FIG. 1 can be configured to be stored or produced in device 132 in a similar manner. In one embodiment, device 132 may include a parameter server as described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105A and 105B in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
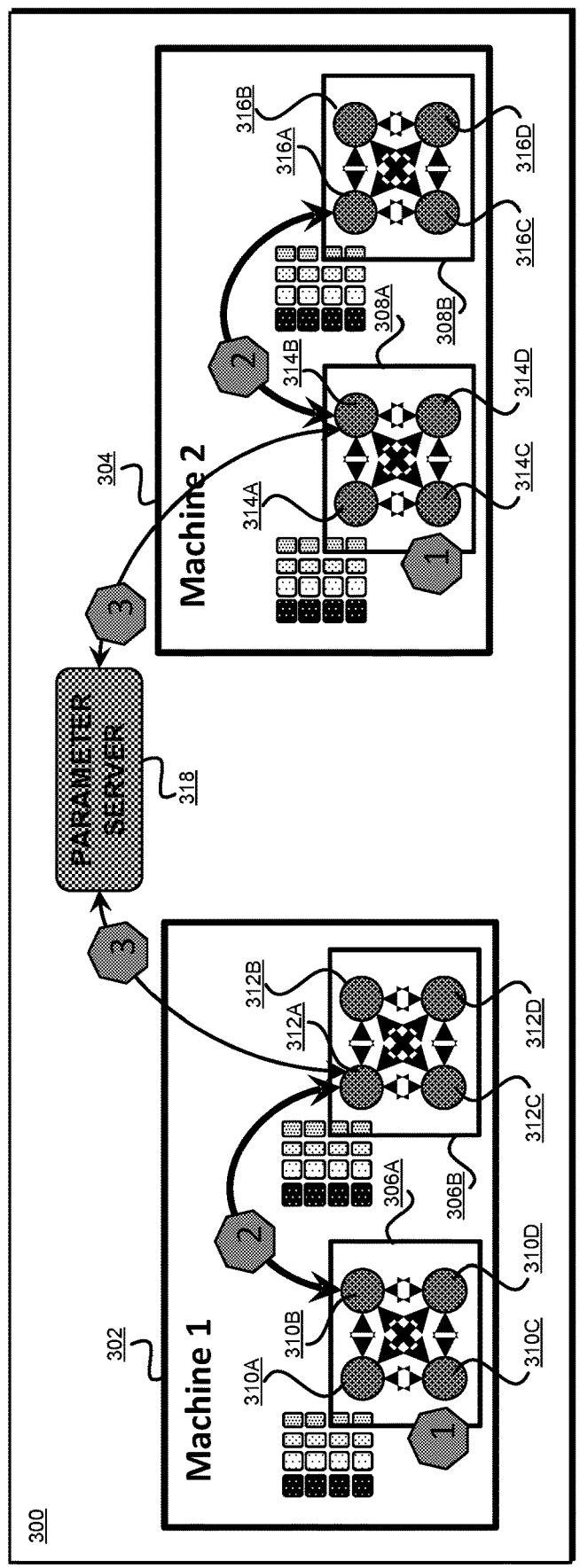
FIG. 3 depicts a simplified block diagram of a multi-machine, multi-GPU architecture in which illustrative embodiments may be implemented.

With respect to FIG. 3, this figure depicts a simplified block diagram of a multi-machine, multi-GPU architecture 300 in which illustrative embodiments may be implemented. In an embodiment, neural network architecture includes a first machine 302 and a second machine 304. In an embodiment, first machine 302 includes server 104 of FIG. 1 and second machine 304 includes server 106 of FIG. 1. In one or more embodiments, first machine 302 executes neural network application 105A and second machine 304 executes neural network application 105B to implement a deep learning neural network. In an embodiment, first machine 302 includes two nodes 306A, 306B. In an embodiment node 306A includes four GPUs 310A, 310B, 310C, 310D, and node 306B includes four GPUs 312A, 312B, 312C, 312D. In an embodiment, second machine 304 includes a two nodes 308A, 308B. In an embodiment node 308A includes four GPUs 314A, 314B, 314C, 314D, and node 308B includes four GPUs 316A, 316B, 316C, 316D. Neural network architecture 300 further includes a parameter server 318.

In an embodiment, during a training of the neural network, GPUs 310A-310D of node 306A of first machine 302 implement a first aggregation procedure to exchange model parameters between GPUs 310A-310D. In the embodiment, GPUs 312A-312D of node 306B of first machine 302 implement the first aggregation procedure to exchange model parameters between GPUs 312A-312D. In the embodiment, GPUs 314A-314D of node 308A of second machine 304 implement the first aggregation procedure to exchange model parameters between GPUs 314A-314D. In the embodiment, GPUs 316A-316D of node 308B of second machine 304 implement the first aggregation procedure to exchange model parameters between GPUs 316A-316D. In a particular embodiment, the first aggregation procedure is an AllReduce aggregation procedure.

In the embodiment, node 306A and node 306B of first machine 302 implement a second aggregation procedure to exchange model parameters between respective leader GPUs of node 306A and node 306B. In the embodiment, node 308A and node 308B of second machine 304 implement the second aggregation procedure to exchange model parameters between respective leader GPUs of node 308A and node 308B. In a particular embodiment, the second aggregation procedure is a aggregation tree-based per-batch aggregation procedure.

In the embodiment, a leader GPU of all GPUs within first machine 302 and a leader GPU of all GPUs within second machine 304 send model parameters to parameter server 318. In the embodiment, parameter server 118 implements a third aggregation procedure to determine updated model parameters and sends the updated model parameters to the leader GPUs of first machine 302 and second machine 304. In the embodiment, the leader GPU of first machine 302 broadcasts the updated model parameters to the leader GPUs of node 306A and node 306B. In the embodiment, the leader GPU of node 306A (e.g., GPU 310A), broadcasts the updated model parameters to the GPUs of node 306A (e.g., GPUs 310B, 310C, 310D). In the embodiment, the leader GPU of node 306B (e.g., GPU 312A), broadcasts the updated model parameters to the GPUs of node 306B (e.g., GPUs 312B, 312C, 312D).

In the embodiment, the leader GPU of second machine 304 broadcasts the updated model parameters to the leader GPUs of node 308A and node 308B. In the embodiment, the leader GPU of node 308A (e.g., GPU 314A), broadcasts the updated model parameters to the GPUs of node 308A (e.g., GPUs 314B, 314C, 314D). In the embodiment, the leader GPU of node 308B (e.g., GPU 316A), broadcasts the updated model parameters to the GPUs of node 308B (e.g., GPUs 316B, 316C, 312D). Accordingly, the updated model parameters are used to update the model of the neural network.

Figure 4:
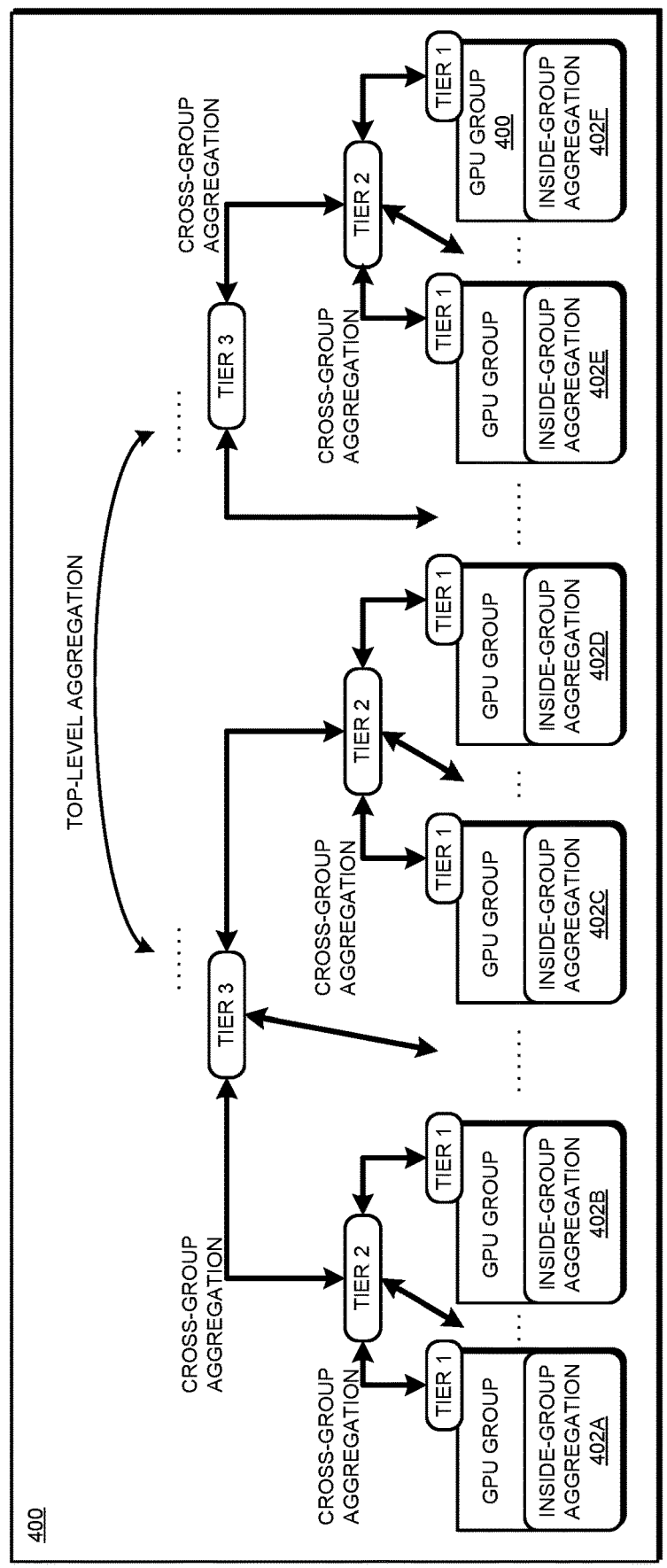
FIG. 4 depicts a simplified block diagram of another multi-machine, multi-GPU in which illustrative embodiments may be implemented.

With respect to FIG. 4, this figure depicts a simplified block diagram of another multi-machine, multi-GPU architecture 400 in which illustrative embodiments may be implemented. In an embodiment, at a first tier a number of GPUs are grouped into GPU groups 402A-402F in which each GPU group includes one or more GPUs. In one or more embodiments, the GPUs are grouped together according to available bandwidth of different communication channels bridging the GPUs. For example, in a particular embodiment, GPUs within the same node of a machine may have a relatively high bandwidth between GPUs and are grouped together into the same group. In an embodiment, each GPU group 402A-402F uses an inside-group aggregation procedure to exchange model parameters between GPUs within the GPU group. In an embodiment, at a second tier one or more GPU groups implement a cross-group aggregation procedure to exchange model parameters between the GPU groups. In the illustrated embodiment, GPU group 402A and 402B implement cross-group aggregation to exchange model parameters at the second tier, GPU group 402C and 402D implement cross-group aggregation to exchange model parameters at the second tier, and GPU group 402E and 402F implement cross-group aggregation to exchange model parameters at the second tier. In an embodiment, at a third tier cross-rank aggregation is performed on the results of the cross-group aggregations. In an embodiment, at a top-level tier a top-level aggregation procedure is used to aggregate the model parameters of all the lower tiers to determine updated model parameters. In accordance with one or more embodiments, aggregation procedures at each tier/level are selected according to factors such as available bandwidth or contention between GPUs.

Figure 5:
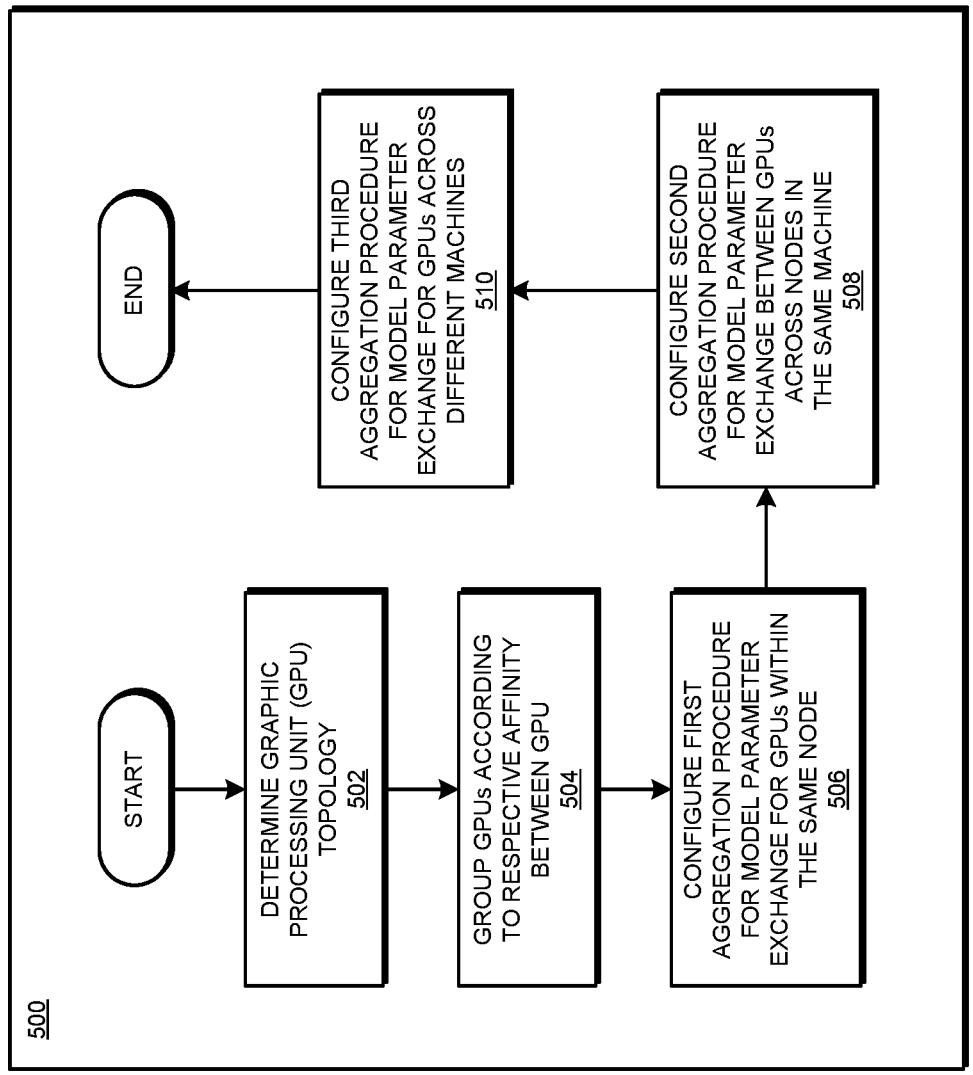
FIG. 5 depicts a flowchart of an example process for configuring hybrid aggregation for a deep learning neural network in accordance with an illustrative embodiment.

With reference to FIG. 5, this figure depicts a flowchart of an example process 500 for configuring hybrid aggregation for a deep learning neural network in accordance with an illustrative embodiment. In block 502, an application determines a graphics processing unit (GPU) topology of a neural network such as deep learning neural network. In various embodiments, the GPU topology describes a relationship between different GPUs within the neural network including an identification of the GPUs that are located in the same node of a machine, an identification of the GPUs that are located within the same machine but different nodes, and an identification of the GPUs that are located in different machines within the neural network. In block 504, the application groups GPUs within the neural network according to the respective affinities between GPUs in which the respective affinities indicate the relationship between respective GPUs. In an embodiment, the GPUs within the same node of the same machine are indicated as a first group, the GPUs within the same machine but different nodes are indicated as a second group, and the GPUs within different machines in the neural network are indicated as a third group.

In block 506, the application configures a first aggregation procedure for model parameter exchange between GPUs within the same node of the same machine (i.e., the first group). In one or more embodiments, a model parameter is a gradient of a cost function of the neural network. In particular embodiments, the first aggregation procedure is an AllReduce-based per-batch aggregation procedure.

In block 508, the application configures a second aggregation procedure for model parameter exchange between GPUs across nodes in the same machine (i.e., the second group). In particular embodiments, the second aggregation procedure is an aggregation tree-based per-batch aggregation procedure. In block 510, the application configures a third aggregation procedure for model parameter exchange between GPUs across different machines in the neural network (i.e., the third group). In particular embodiments, the third aggregation procedure is a model averaging aggregation procedure. In one or more embodiments, the third aggregation procedure is configured within a parameter server. The process 500 then ends. Although in various embodiments processes are described as being performed by one or more applications, in other embodiments the processes may be performed by one or more GPUs, or a combination of applications and GPUs.

Figure 6:
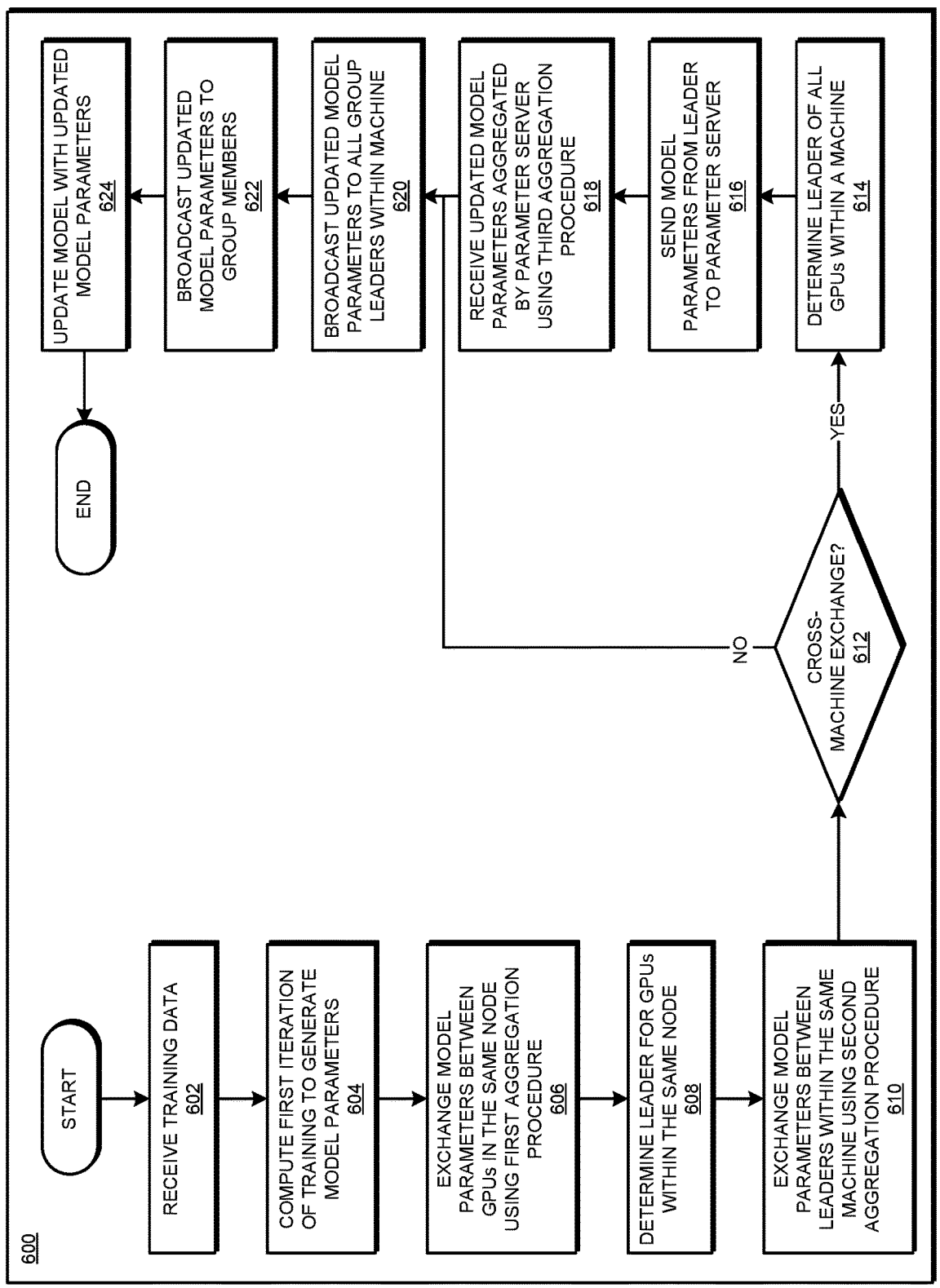
FIG. 6 depicts a flowchart of an example process for hybrid aggregation during training of a deep learning neural network in accordance with an illustrative embodiment.

With reference to FIG. 6, this figure depicts a flowchart of an example process 600 for hybrid aggregation during training of a deep learning neural network in accordance with an illustrative embodiment. In block 602, an application receives training data for training the neural network. In a particular embodiment, the training data includes image data. In one or more embodiments, the application receives the training data 109 from storage device 108 of FIG. 1. In block 604, the application (or one or more GPUs) compute a first iteration of training to generate model parameters. In one or more embodiments, a model parameter is a gradient of a cost function of the neural network.

In block 606, the GPUs in the same node of the same machine exchange the model parameters using a first aggregation procedure. In particular embodiments, the first aggregation procedure is an AllReduce-based per-batch aggregation procedure. In block 608, the application, or alternately the GPUs, determine a leader GPU for the GPUs within the same node. In a particular embodiment, the application determines the leader GPU based upon a GPU identifier associated with each GPU of the node. In another embodiment, the application determines the leader GPU based upon available bandwidth or processing power of a particular GPU. In a particular example, the application elects the GPU having the lowest value of a GPU identifier among the GPU identifiers of the GPUs of the node as the leader GPU for the node. In block 610, the leader GPUs for each node within the same machine exchange model parameters using the second aggregation procedure. In particular embodiments, the second aggregation procedure is an aggregation tree-based per-batch aggregation procedure.

In block 612, the application determines whether a cross-machine exchange of model parameters between GPUs in different machines is necessary for training. If cross-exchange is not necessary, the process continues to block 620 as will be further described herein. If cross-exchange is necessary, in block 614 the application determines a leader GPU of all GPUs within a machine. In a particular embodiment, the application determines the leader GPU for all GPUs within a machine based upon a GPU identifier associated with each GPU. In a particular example, the application determines that the GPU having the lowest GPU identifier among all of the GPUs of the machine is selected as the leader GPU.

In block 616, the leader GPU for each machine sends the model parameters to a parameter server. In a particular embodiment, the parameter server is a server configured to receive model parameters from one or more machines, perform a third aggregation procedure on the model parameters to determine updated model parameters, and send the updated model parameters to the leader GPU for each machine. In an alternative embodiment, one or more of the leader GPUs for a machine, receives the model parameters from the leader GPU for each machine, performs the third aggregation procedure on the model parameters to determine the updated parameters, and sends the updated model parameters to the leader GPU for each machine without requiring use of the parameter server.

In block 618, the leader GPU for each machine receives the updated model parameters from the parameter server. In block 620, the leader GPU for each machine broadcasts the updated model parameters to the leader of each group of GPUs within a node of a machine. In block 622, the leader of each group of GPUs within a node broadcasts the updated model parameters to each group member of the GPUs within the same node. In block 624, the application and/or GPUs update the model of the neural network based upon the updated model parameters. In one or more embodiments, blocks 602-624 are repeated using additional training data until the model is trained to a desired level. The process 600 then ends. Although in various embodiments processes are described as being performed by one or more applications, in other embodiments the processes may be performed by one or more GPUs, or a combination of applications and GPUs. In accordance with at least one embodiment, improved scalability of multi-GPU based deep learning networks is realized by the described process.

Although various embodiments are described with respect to hybrid aggregation operations within a neural network, it should be understood that the principles described herein may be applied to any suitable data processing operations performed by a computer system or other electronic device.

Thus, a computer implemented method, system or apparatus, and computer program product are provided in the illustrative embodiments for hybrid aggregation operations with a neural network and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

determining a processing unit topology of a neural network including a plurality of processing units, wherein the neural network includes at least one machine in which each machine includes a plurality of nodes, and wherein each node includes at least one of the plurality of processing units;

computing an iteration of a model of the neural network to generate model parameters of the model;

causing a processing unit in a first group of the neural network to perform according to the model parameters, the causing resulting from exchanging the model parameters between processing units in the first group using an AllReduce-based aggregation procedure, the first group comprising processing units within a first node of a first machine;

determining a leader processing unit within the first group; and causing a processing unit in another group of the neural network to perform according to the model parameters, the causing resulting from exchanging the model parameters between a leader processing unit in the first group and a leader processing unit in the another group of processing units within a second node of the first machine using a tree-based aggregation procedure.

2. The method of claim 1, further comprising:

sending the model parameters from the leader processing unit to a server, wherein the server is configured to determine updated model parameters using a model averaging aggregation procedure.

3. The method of claim 2, further comprising:

receiving the updated model parameters at a second leader processing unit within a second machine;

broadcasting the updated model parameters to the processing units within the second machine; and updating the model of the neural network based upon the updated model parameters.

4. The method of claim 3, wherein broadcasting the updated model parameters to the processing units within the second machine further comprises:

broadcasting, to a third leader processing unit, the updated model parameters, the third leader processing unit included in a different node from the node of the second leader processing unit;

broadcasting, from the third leader processing unit to a processing unit within the different node, the updated model parameters.

5. The method of claim 1, wherein the model parameters include a gradient of a loss function of the neural network.

6. The method of claim 1, wherein the plurality of processing units includes a graphics processing unit.

7. The method of claim 1, wherein the leader processing unit is determined based upon an identifier associated with each processing unit in the first group.

8. The method of claim 1, wherein the leader processing unit is determined based upon available bandwidth of a processing unit in the first group.

9. The method of claim 1, wherein the leader processing unit is determined based upon processing power of a processing unit in the first group.

10. A computer usable program product comprising one or more computer-readable storage media, and program instructions stored on at least one of the one or more storage media, the stored program instructions comprising:

program instructions to determine a processing unit topology of a neural network including a plurality of processing units, wherein the neural network includes at least one machine in which each machine includes a plurality of nodes, and wherein each node includes at least one of the plurality of processing units;

program instructions to compute an iteration of a model of the neural network to generate model parameters of the model;

program instructions to cause a processing unit in a first group of the neural network to perform according to the model parameters, the causing resulting from exchanging the model parameters between processing units in the first group using an AllReduce-based aggregation procedure, the first group comprising processing units within a first node of a first machine;

program instructions to determine a leader processing unit within the first group; and program instructions to cause a processing unit in another group of the neural network to perform according to the model parameters, the causing resulting from exchanging the model parameters between a leader processing unit in the first group and a leader processing unit in the another group of processing units within a second node of the first machine using a tree-based aggregation procedure.

11. The computer usable program product of claim 10, wherein the computer usable code is stored in a computer readable storage device in a data processing system, and wherein the computer usable code is transferred over a network from a remote data processing system.

12. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

13. The computer usable program product of claim 10, further comprising:

program instructions to send the model parameters from the leader processing unit to a server, wherein the server is configured to determine updated model parameters using a model averaging aggregation procedure.

14. The computer usable program product of claim 13, further comprising:

program instructions to receive the updated model parameters at a second leader processing unit within a second machine;

program instructions to broadcast the updated model parameters to the processing units within the second machine; and program instructions to update the model of the neural network based upon the updated model parameters.

15. The computer usable program product of claim 14, wherein program instructions to broadcast the updated model parameters to the processing units within the second machine further comprises:

program instructions to broadcast, to a third leader processing unit, the updated model parameters, the third leader processing unit included in a different node from the node of the second leader processing unit;

program instructions to broadcast, from the third leader processing unit to a processing unit within the different node, the updated model parameters.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to determine a processing unit topology of a neural network including a plurality of processing units, wherein the neural network includes at least one machine in which each machine includes a plurality of nodes, and wherein each node includes at least one of the plurality of processing units;

program instructions to compute an iteration of a model of the neural network to generate model parameters of the model;

program instructions to cause a processing unit in a first group of the neural network to perform according to the model parameters, the causing resulting from exchanging the model parameters between processing units in the first group using an AllReduce-based aggregation procedure, the first group comprising processing units within a first node of a first machine;

program instructions to determine a leader processing unit within the first group; and program instructions to causing a processing unit in another group of the neural network to perform according to the model parameters, the causing resulting from exchanging the model parameters between a leader processing unit in the first group and a leader processing unit in the another group of processing units within a second node of the first machine using a tree-based aggregation procedure.

\* \* \* \* \*